Figure 1:
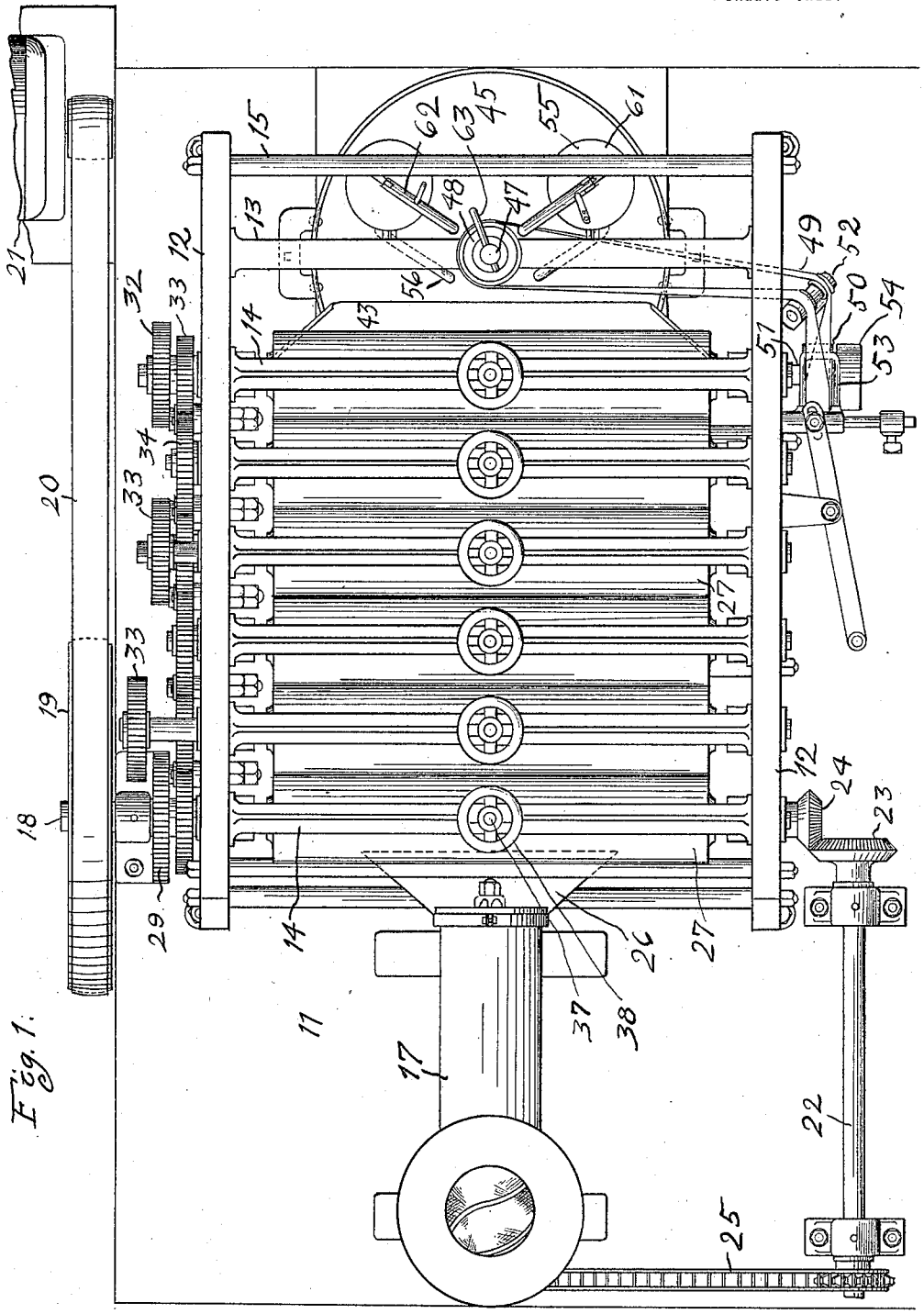

D. J. ITAYA.
MEAT GRINDING MACHINE.
APPLICATION FILED JUNE 18, 1918.

1,310,572.

Patented July 22, 1919.
4 SHEETS—SHEET 1.

INVENTOR: D. Junzo Itaya,
By His Atty.

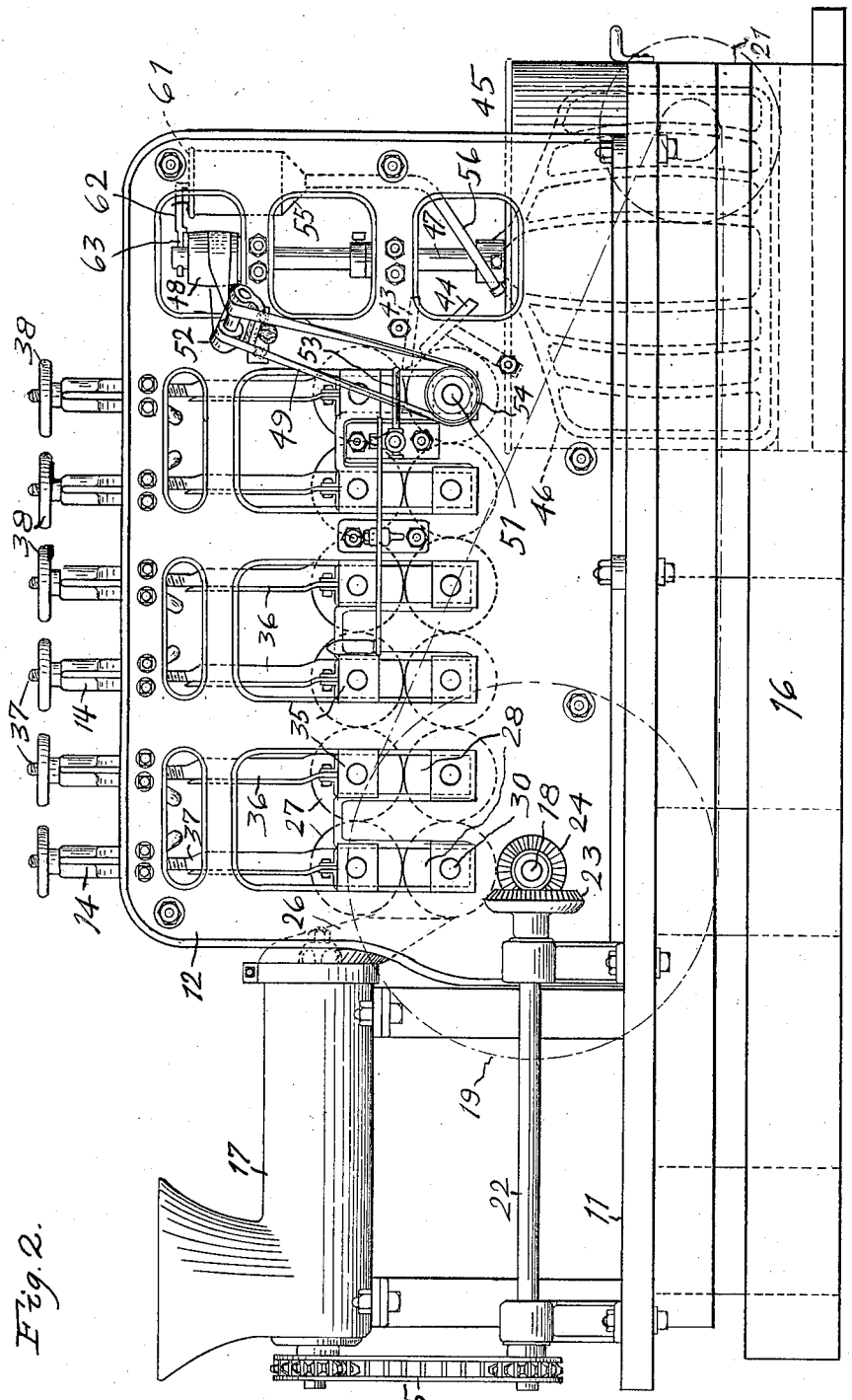

D. J. ITAYA.
MEAT GRINDING MACHINE.
APPLICATION FILED JUNE 18, 1918.
1,310,572.
Patented July 22, 1919.
4 SHEETS—SHEET 3.
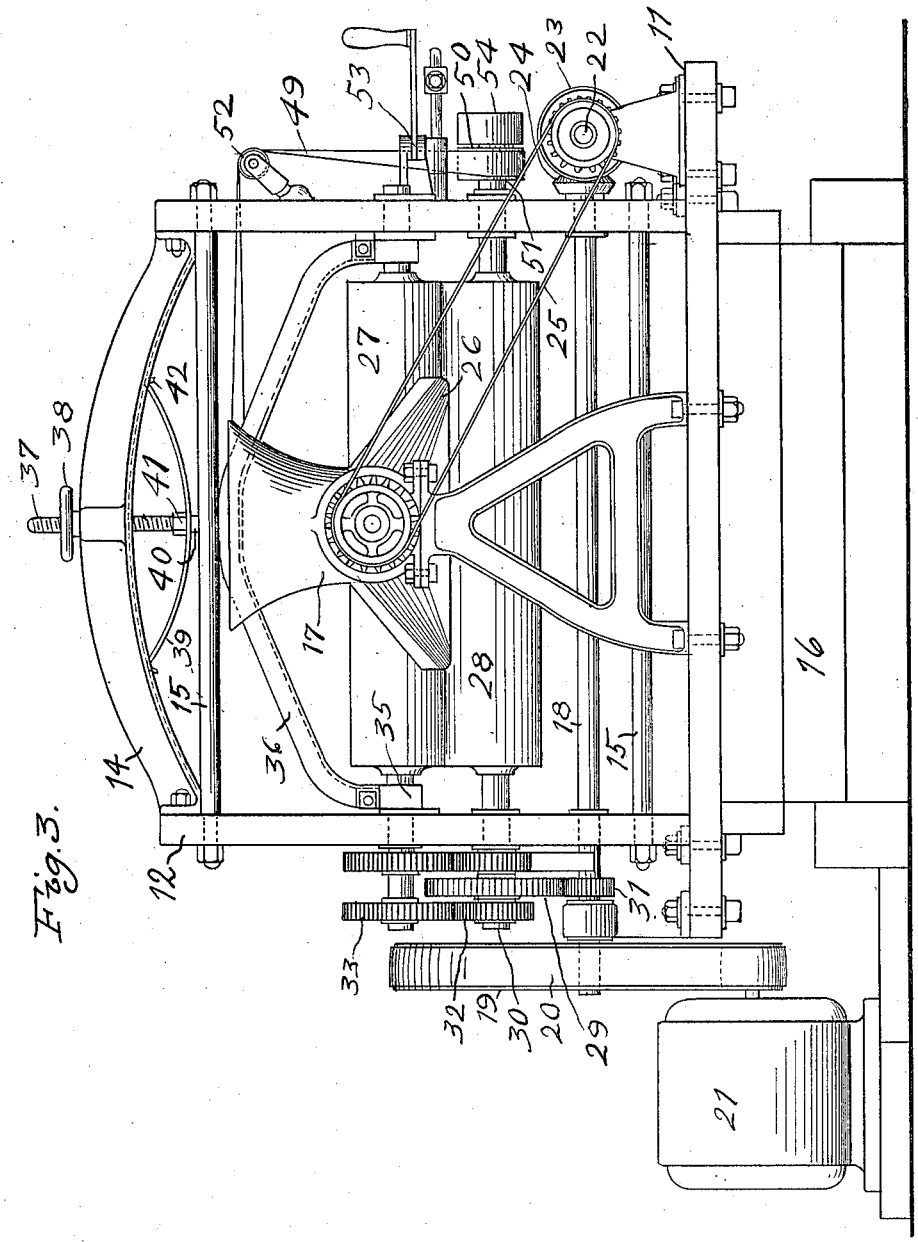
INVENTOR. D. Junzo Itaya.
By His Atty. Edward M. Kajima

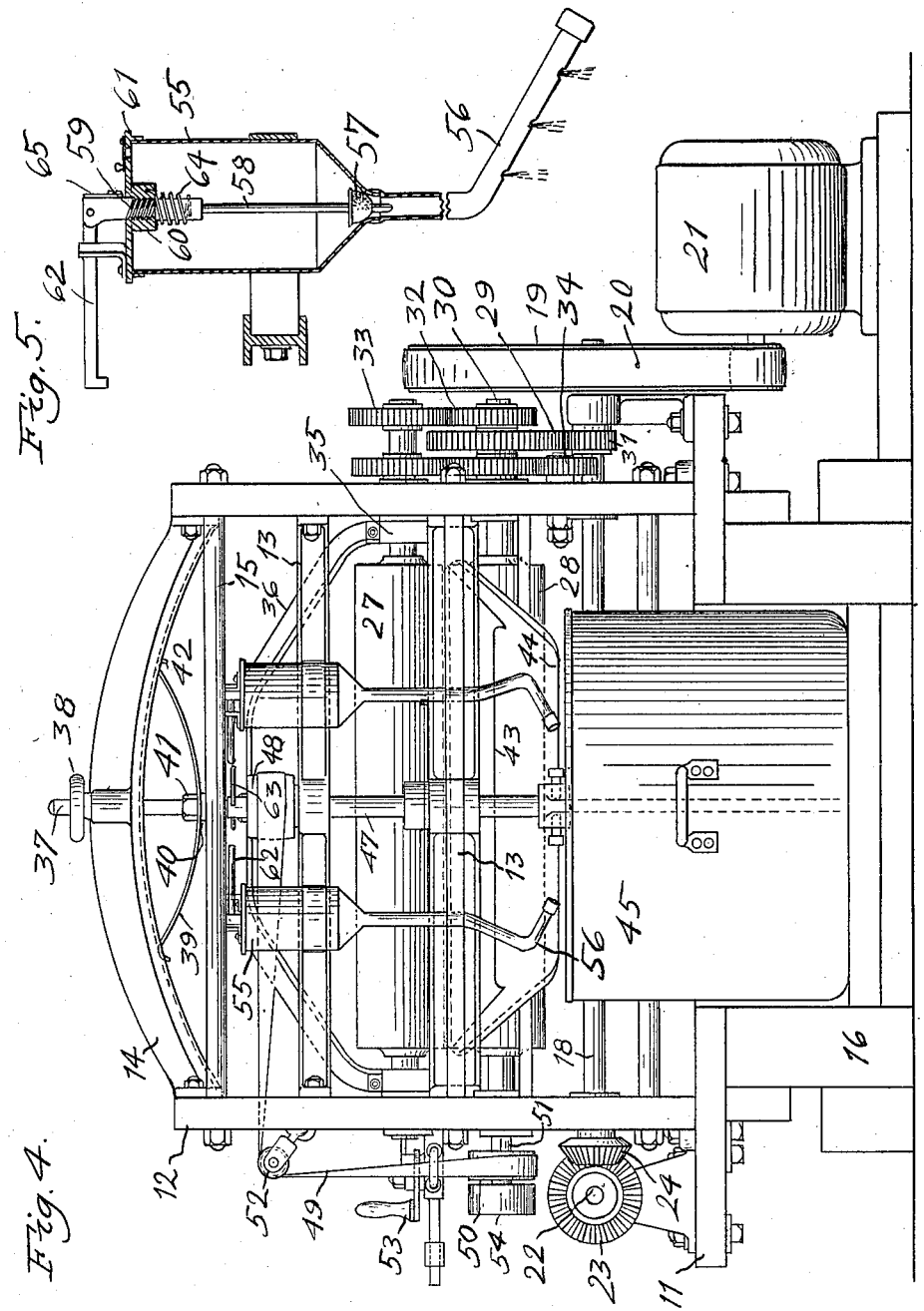

UNITED STATES PATENT OFFICE.

DOUGLAS JUNZO ITAYA, OF LOS ANGELES, CALIFORNIA.

MEAT-GRINDING MACHINE.

1,310,572.  Specification of Letters Patent.  Patented July 22, 1919.

Application filed June 18, 1918. Serial No. 240,611.

*To all whom it may concern:*

Be it known that I, DOUGLAS JUNZO ITAYA, a subject of the Emperor of Japan, residing at Los Angeles, in the county of Los Angeles and State of California, have invented a new and useful Improvement in Meat-Grinding Machines, of which the following is a specification.

This invention has relation to a meat cutting and grinding machine in which a meat cutter is arranged to operate in conjunction with a series of rollers which pulverize and grind the material after passing the cutter, and with a mixer and flavoring device, all of which are operative to convert the raw food material into a prepared and seasoned product.

The objects of this invention are to provide an improved means for efficiently grinding, pulverizing, and mixing meat and fish food products, and to mechanically mix a flavoring material with the ground product, the invention being particularly adapted for preparing fish sausage.

With these ends in view the invention consists in the improved construction, combination and arrangement of parts which will be hereinafter fully described and pointed out in the claims.

In the accompanying drawings has been illustrated a simple and preferred form of the invention, it being however, understood that no limitation is necessarily made to the precise structural details exhibited, but that the right is reserved to any changes, alterations, and modifications to which recourse may be had within the scope of the invention.

In the drawings, Figure 1 is a top plan view of a fish sausage machine in which the principles of my invention have been incorporated. Fig. 2 is a side elevation of the same. Fig. 3 is a front elevation of the same. Fig. 4 is a rear elevation of the same. Fig. 5 is a sectional detail view of the distributer for the flavoring ingredients to be mixed with the ground food products.

Assuming the invention to be embodied as illustrated, the platform 11, side frame members 12, and transverse bars 13, 14, 15, constitute the framework of the machine, which is adapted to be secured to any suitable base 16. At the front end is mounted the meat cutter 17, which may be of any suitable construction, and the same is not detailed herein. The main shaft 18 is journaled in the side frames 12, and has mounted thereon the belt wheel 19, which, in this case, is connected by belt 20, with an electric motor 21, although any preferred motive means may be employed. A countershaft 22, through bevel gear wheels 23, 24, is driven by the main shaft 18. A sprocket and chain connection 25, extends between the meat cutter and the countershaft.

After the meat or fish has been cut, it passes over the distributing hopper 26 to the grinding and pulverizing rollers 27, 28, which are disposed in a series of pairs to consecutively grind the food materials passing therebetween. A gear wheel 29 is mounted on the shaft 30, of the first and lowermost grinding roller 28, and is in mesh with a pinion 31, mounted on the main shaft. Through gear wheels 32, 33, the upper rollers 27 are revolubly driven in the opposite direction. Gear wheels 34, in mesh with the lowermost gear wheels 32, are arranged to drive the lowermost rollers in a similar direction.

It may thus be seen that the meat or fish after passing through the cutter, will then pass through consecutive pairs of rollers, until it is finally ground to the required fineness. The uppermost rollers are revolubly mounted in bearings 35, on supporting yokes 36; said yokes having fixed thereto, the threaded rods 37, which extend upwardly and through the bridge members 14, the rods 37 having mounted thereon, the hand wheels 38, which may be operated to lift the uppermost rollers, as in cleaning and repairing the same.

The rollers are preferably constructed of granite stone, and the uppermost rollers are thus forced by gravity into an operative engagement with the lowermost rollers. To assist in maintaining the rollers in coöperative engagement, the springs 39 are secured to rods 37, by adjustable nuts 40, and 41; the springs having their free extremities 42, bearing against frame members 14.

The ground food products are removed from the rollers by the scrapers 43, 44, and pass therebetween and into the mixing tank 45, where the same is thoroughly stirred by the agitator 46. The agitator is mounted on a shaft 47, which is journaled in transverse frame members 13, and has fixed to the opposite end the belt pulley 48. A belt 49, connects pulley 48, and a belt pulley 50, mounted on the last and lowermost roller shaft 51; said belt passing over idler pulleys 52, and through the belt shifter 53, which may be shifted to throw the belt upon the free pulley 54, thus providing an independent control for the mixing means relative to the grinding means.

Means for mechanically distributing the seasoning and flavoring ingredients to the mixture, consist of auxiliary tanks 55, having extending therefrom the delivery tubes 56, suitably pierced for distribution of the flavor. At the bottom of the tanks are provided the valves 57, having the stems 58 extending upward, and provided with a threaded section 59, in engagement with the threaded lug 60, on the cover 61. The rotation of the valve stem will lift the valve a proportional amount. The valve stem is provided with a lever 62, adapted to be actuated by the tappet 63, on shaft 47. A coil spring 64 having one end secured to the lug 60 and the opposite end secured to the valve stem, serves to retract the valve to closed position. Duplicate container tanks and distributing mechanism is provided. The valve lever is hingedly connected to the valve stem, and may be turned upward so that the lever will not be effected by the tappet. The lever is retained in either operative or inoperative position by a spring 65. Either distributer may be placed in inoperative position at the will of the operator.

From the foregoing it may be seen that I have provided an efficient apparatus for the production of fish sausage from the raw material. The factors serving for cutting, grinding, mixing, and distributing the flavoring ingredients in the cut and ground ingredients, are all arranged for coöperative or independent action, whereby absolute control of the product is attained.

What is claimed is:

1. In a machine of the character described, the combination with cutting and grinding means, of mixing means in coöperative relation with the cutting and grinding means, scraping means for transmitting the ground material to the mixing means, and flavor distributers in coöperative relation with the mixing means, all arranged for simultaneous action.

2. In a machine of the character described, the combination with cutting means, of grinding means in coöperative relation therewith, a mixing tank disposed in relation to the grinding means, and a revoluble agitator mounted in the mixing tank and revolving in unison with the cutting and grinding means.

3. In a machine of the character described, the combination with cutting and grinding means, of a mixing tank disposed in relation thereto, and a revoluble agitator mounted in the tank, said agitator being operative independent of the cutting and grinding means.

4. In a machine of the character described, the combination with cutting and grinding means, arranged for consecutive operation, of a mixing tank disposed in relation to the grinding means, an agitator in the mixing tank, a belt transmission connecting the grinding means and the agitator, and means for shifting the belt transmission means to control the agitator.

5. In a machine of the character described, the combination with cutting, grinding, and mixing means, all arranged for coöperative action, of separate flavoring containers, a delivery tube extending from each container to the mixing means, a valve in the bottom of each container, and means for intermittently operating the valves to open position.

6. In a machine of the character described, the combination with cutting, grinding, and mixing means, all arranged for coöperative action, of flavoring containers, delivery conductors extending therefrom to the mixing means, control valves for the delivery conductors, oscillative levers to operate the valves and extending without the containers, an operative shaft for the mixing means, tappet arms on the operative shaft and intermittently actuating the oscillative levers, and coil springs arranged to retract the levers to normal position.

In testimony whereof, I hereunto affix my signature.

D. JUNZO ITAYA.

In presence of—
J. W. MASTER,
FREDERIC M. KEENEY.

Copies of this patent may be obtained for five cents each, by addressing the "Commissioner of Patents, Washington, D. C."